United States Patent
Benson et al.

[15] 3,684,332
[45] Aug. 15, 1972

[54] APPARATUS FOR ADJUSTING THE CENTER DISTANCE BETWEEN BEARING SUPPORT MEMBERS

[72] Inventors: John F. Benson, Hamilton County; Daniel R. Shern, Greenhills, both of Ohio

[73] Assignee: The Procter & Gamble Company, Cincinnati, Ohio

[22] Filed: March 29, 1971

[21] Appl. No.: 128,751

[52] U.S. Cl....................................................308/60
[51] Int. Cl.........................F16c 23/00, F16c 35/00
[58] Field of Search..............................308/680, 58

[56] References Cited

UNITED STATES PATENTS 1,943,142   1/1934   Peters...........................308/60

Primary Examiner—Martin P. Schwadron
Assistant Examiner—Frank Susko
Attorney—Fredrick H. Braun and John V. Gorman

[57] ABSTRACT

An apparatus for increasing or decreasing the center distance between bearing support members. The bearing support members may comprise blocks suitably spaced and supported so that at least one member of the pair is slidably disposed, there being a spacing member interposed between the bearing blocks. A jack member is provided to exert a substantial static clamping force on the assembled elements. The spacing member is made of a thermally expansible or contractable material and preferably has an electric heater embedded therein. Control means are provided to energize or de-energize the heater thereby causing expansion or contraction of the spacing member to change the spacing between the bearing blocks. In a preferred use, the apparatus controls the nip distance between a pair of co-acting sheeting rolls.

8 Claims, 2 Drawing Figures

INVENTORS
John F. Benson
Daniel R. Shern
BY
*Fredrick H. Brown*
ATTORNEY

APPARATUS FOR ADJUSTING THE CENTER DISTANCE BETWEEN BEARING SUPPORT MEMBERS

BACKGROUND OF THE INVENTION

Numerous devices have been previously devised for the express purpose of controlling or adjusting the center distance between bearings. In particular, devices of this kind are used to control the spacing between pairs of co-acting rollers such as used in a rolling mill, a corrugating apparatus, or the sheeting rolls of a dough processor or the like. These prior devices have been used particularly for adjusting and controlling the spacing between bearing supports so that the nip distance between a pair of rolls can be adjusted within a narrow limits when the rolls are in operation.

In general, such devices have been primarily of an hydraulic or mechanical nature. A typical example of the use of an hydraulic system for varying the center distance between bearings and the rolls supported thereby is described in U.S. Pat. No. 2,610,801 issued to Edgar H. Miller on Sept. 16, 1952. The use of a mechanical linkage to adjust one or both ends of a movable roller is disclosed in U.S. Pat. No. 2,735,732 issued to Tom Rowlands et al. on Feb. 21, 1956; and the provision of handwheels for accomplishing essentially the same effect is found in the teachings of U.S. Pat. No. 1,943,142 issued to Elmer P. Peters on Jan. 9, 1934. In each of these earlier instances, the device for controlling the movement of bearing support members has been of an hydraulic or mechanical nature. Such systems are known to have certain drawbacks when extremely small changes are being made as, for example, when controlling the nip distance between a pair of sheeting rolls used to roll an edible dough in a high speed process.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of an apparatus for adjusting the center distance between bearing support members.

Another object of the invention is the provision of an apparatus for accomplishing the above purpose which provides a precise control for moving a mill roll during operation against a heavy force or load.

Still another object of the invention is the provision of an apparatus of the foregoing character this is uniquely free of hysteresis or free play and is readily adaptable to automatic control.

These and other objects are achieved by providing an apparatus for adjusting and controlling the center distance between a pair of suitably supported spaced bearing blocks at least one of which is slidably disposed. The structure includes a spacing member interposed between the bearing blocks, the spacing member being dimensionally responsive to changes in its total thermal energy. A resilient force is applied to the bearing blocks and the interposed spacing member by suitable means which in a preferred structural embodiment of the invention may take the form of a compressive force applied by a jack member. The spacing member is preferably provided with an internal device, e.g. an embedded heating element, or internal passages for heating or cooling fluids, or combinations thereof, for varying its total thermal energy and thus changing its length as measured between the bearing blocks. This causes a corresponding change in spacing between the rotating elements being supported thereby. Suitable sensing and control circuits are preferably provided to energize the thermal device associated with the spacing member.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing in which:

DESCRIPTION OF THE PREFERRED EMBODIMENT

The present invention is particularly adapted for controlling the center distance between a pair of sheeting rolls which continuously roll a sheet of edible dough. For example, the sheeting rolls may be used to roll an edible potato dough which is continuously supplied to an apparatus for making chips, e.g. potato chips, of the kind disclosed and claimed in U.S. Pat. No. 3,520,248 entitled CHIP FRYING MACHINE, which issued to Robert G. MacKendrick on July 14, 1970. This is a typical and preferred illustration of the usefulness of the present invention although it will be understood that it can be applied in many other fields, especially where accurate control between a pair of bearing centers is sought.

Figure 1:
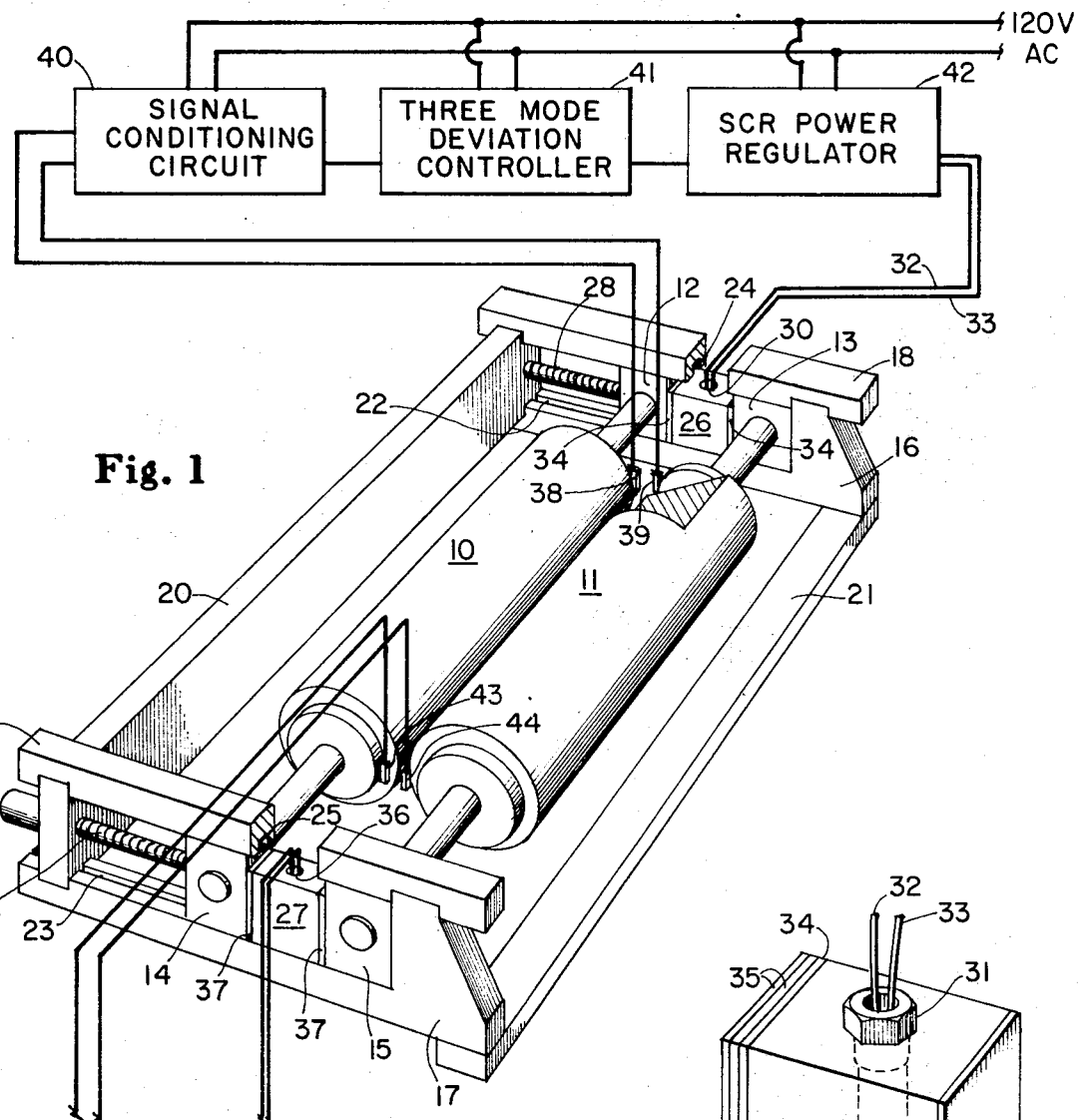
FIG. 1 is a fragmentary isometric view including a schematic circuit diagram illustrating a pair of sheeting rolls mounted in a supporting structure which shows the means for adjusting the center distance between bearing block members.

Referring now to the drawing, and particularly FIG. 1 thereof, it will be noted that a pair of co-acting sheeting rolls 10 and 11 are supported at one end by the bearing blocks 12 and 13, respectively, and at the other end by the bearing blocks 14 and 15, respectively. Suitable drive means (not shown) are provided to continuously rotate the rolls 10 and 11 at predetermined speeds. The shaft extending from either end of the sheeting rolls 10 and 11 will, of course, be provided with suitable journals or bearings which rotate freely within the bearing blocks 12, 13, 14 and 15 as will be understood by those skilled in the art.

A structure is provided for supporting the bearing blocks 12, 13, 14 and 15. This includes the angular support members 16 and 17, the guide members 18 and 19 and the cross members 20 and 21 all of which are secured together by means that are generally well known in the art. Preferably, suitable guide grooves 22 and 23 are provided in the angular supports 16 and 17, respectively, and the bearing blocks 12, 13, 14 and 15 have projections (not shown) which engage the grooves 22 and 23 to prevent axial movement of the bearing blocks. Similarly, guide grooves 24 and 25 are preferably formed in the guide members 18 and 19, respectively, for the purpose of engaging upwardly extending projections (not shown) in the bearing blocks 12, 13, 14 and 15. It will be apparent, of course, that the grooves 22, 23, 24 and 25 allow support of the bearing blocks 12 and 14 with individual lateral slidable movement. While the bearing blocks 13 and 15 preferably remain in contact with the angular portion of support members 16 and 17, respectively, they can, if desired, also be assembled such that lateral slidable movement may be imparted thereto.

A spacing member 26 is interposed between the bearing blocks 12 and 13 and, similarly, a spacing member 27 is interposed between the bearing clocks 14 and 15. The spacing members 26 and 27 are preferably made from a thermally expansible or contractible material. This allows changes in length (particularly as measured between the pairs of bearing blocks 12–13 and 14–15) in direct proportion to changes in their total thermal energy. This physical property is an inherent characteristic of most metallic materials although aluminum has been found to be a preferable material in the actual practice of the invention. In using aluminum for the spacing members 26 and 27, a temperature change of about 13° F. will change the length L (see FIG. 2) about 0.001 inch when the dimension L is about 6 inches.

The bearing blocks and spacing members are held in assembled relationship by suitable means which exerts a transverse compressive force and also acts as a resilient spring during expansion and contraction of the spacing members 26 and 27. This is referred to herein as a resilient compressive force. Referring again to FIG. 1, a jack member 28 is provided for this function on one side and a similar jack member 29 is provided for the same function on the other side. In practice, it has been found that an initial compressive force of about 1,000 pounds per square inch of cross section of the spacing members 26 or 27 exerted by each of the jack members 28 and 29, respectively, is preferred. A force of this magnitude will satisfactorily maintain the bearing blocks in their assembled relationship and yet will allow change in their center distance due to expansion or contraction of either of the spacing members 26 or 27.

Figure 2:
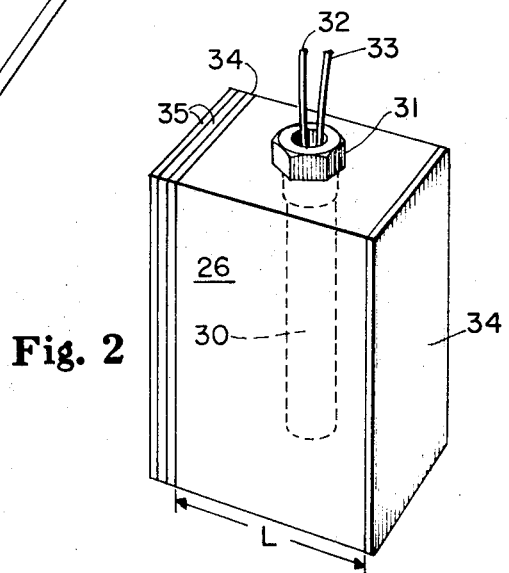
FIG. 2 is an isometric illustration of a spacing member which is normally interposed between a pair of bearing blocks showing the manner in which an electric heater may be embedded therein.

FIG. 2 illustrates the details of the spacing member 26. It will be understood that the spacing member 27 is of similar construction. In the preferred form illustrated in FIG. 2, the spacing member 26 has an electric cartridge heating element 30 embedded therein preferably by means of a nut 31 which is threaded into the upper portion of the member 26. In practice, a cartridge heater of the type manufactured by Watlow Electric Manufacturing Company, type J8A84 has been found suitable for this purpose. Lead wires 32 and 33 project from the heating element 30. Thermal insulation shims 34 are preferably provided at the side faces of the spacing member 26 in order to minimize conduction of heat from the member 26 to other elements of the bearing and support structure. It is also possible to use, when desired, spacing shims 35 in order to accurately preset a desired spacing between the bearing blocks upon initial assembly. The spacing member 27 is also provided with an electric cartridge heating element 36 (see FIG. 1) as well as thermal insulation shims 37 and spacing shims (if needed) similar to those described in connection with the spacing member 26.

A suitable electrical control circuit is provided for individually energizing, when necessary, the heating elements in each of the spacing members 26 and 27 in order to individually change the center distance, as desired, between the sheeting rolls 10 and 11 at each end thereof. In some cases only one control may be used for simultaneously controlling both spacing members 26 and 27. Preferably, however, two individual controls are used inasmuch as it will permit control of spacing as well as adjustments in parallelism between the rolls.

The control for energizing the heating element 30 embedded in the spacing member 26 will now be described. It will be understood that similar control circuits are used for the heating element 36 embedded in the spacing member 27. However, it will be unnecessary to describe the control circuit for the heating element 27 inasmuch as it is preferably identical to the control circuit for the heating element 30.

Proximity sensors 38 and 39 are mounted contiguous to the sheeting rolls 10 and 11, respectively, for the purpose of sensing the relative position of each roll and thereby "reading" the nip distance between the rolls. Preferably the proximity sensors are of the type available from the Bentley Nevada Corporation, preferably model 310–L36 probes and model 3115 proximitors. The output from the proximity sensors 38 and 39 is transmitted to a conventional signal conditioning and amplifying circuit 40 (e.g. a Bell & Howell type 19–301A).

The conditioned output signal from the circuit 40 is then transmitted to a three mode deviation controller 41 (e.g. Taylor Instrument Companies model 944 RD 14110(12)B), which has been adjusted to control the spacing between the sheeting rolls 10 and 11 at some desired point. In the event that the spacing deviates from the desired and preset point, the control 41 will produce a correcting change in the output signal which it feeds to the SCR power regulator 42 (e.g. a Robicon Corporation model 313–104). The signal changes in a direction (either growing stronger or weaker) which will cause the SCR power regulator 42 to make a corresponding change in the amount of power being fed to the electric heating element 30 for conversion into thermal energy within the spacing member 26.

Thermal energy is continually being lost from the spacing member 26 by convection and radiation into the surrounding space and, more particularly, by conduction through the thermal insulation shims 34 into the adjoining bearing blocks 12 and 13 and the supporting structure of the milling rolls from whence it is also radiated into the surrounding space. The rate at which thermal energy is lost is controlled by selecting a proper combination of thickness, area and material for the thermal insulation shims 34.

The total thermal energy of the spacing member 26 will vary depending on whether more energy is fed in via the heating element 30 than is lost as described above or vice versa. This variation in total thermal energy of spacing member 26 causes it to change its length L correspondingly and therefore the spacing between the bearing blocks 12 and 13. The change in center distance between the bearing blocks 12 and 13 is accomplished against the resistance of the jack member 28 since, as previously explained, the latter exerts a resilient compressive force that is overcome by the expansion of the spacing member 26. It will be readily understood by those skilled in the art that in this way the system operates to maintain a constant predetermined spacing between the sheeting rolls.

The spacing between bearing blocks 14 and 15 is similarly controlled by the spacing member 27 by energizing the electric cartridge heating element 36 through a similar circuit as heretofore described. The gap between the sheeting rolls 10 and 11 at the end nearest the spacing element 27 is sensed by proximity sensors 43 and 44 which "read" the nip distance and send their output to a signal conditioning circuit, etc.

While a preferred embodiment of the invention has been described heretofore, it will be apparent that variations can be made without departing from the spirit and scope thereof. For example, the means for heating the spacing members 26 and 27 can take any of several forms including that of embedding several heater elements in each spacing member 26 and 27. Furthermore, the size and shape of the spacing members can be varied to suit any particular use thereof and the material of the spacing members can be changed if for some reason aluminum is not suitable.

There are also means of sensing the roll spacing other than proximity sensors. For example, the actuating system could be operated with feedback from a device measuring thickness or other characteristics of the sheet that is being acted upon by the rolls 10 and 11.

While the invention has been described in the context of controlling the center distance between the bearing supports exclusively by heating, it will be apparent that cooling means could be substituted to obtain equivalent results. In fact, it is possible to embed both heating and cooling elements in the spacing members 26 and 27 in those cases where this would be beneficial. It is also possible, of course to utilize the concept of the invention by placing the spacing members 26 and 27 in tension rather than compression, for example, by placing an outwardly directed tensile force on each of the bearing blocks so that the respective spacing members 26 or 27 are under a static tensile load when in use.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. Apparatus for adjusting and controlling the center distance between a pair of spaced bearing blocks, at least one of which is slidably supported, said apparatus comprising:
    a. a spacing member interposed between said bearing blocks, said spacing member being dimensionally variable in response to changes in its total thermal energy,
    b. means for exerting a resilient force on said bearing blocks including said spacing member interposed therebetween, and
    c. means for varying the total thermal energy in said spacing member to change its length as measured between said bearing blocks and thereby vary the spacing between said bearing blocks within close dimensional limits.

2. Apparatus as claimed in claim 1 wherein said resilient force is a compressive force.

3. Apparatus as claimed in claim 1 wherein said means for varying the total thermal energy in said spacing member comprises an embedded electric heating element.

4. Apparatus as claimed in claim 1 including a thermal insulation shim interposed between the spacing member and each of said bearing blocks.

5. Apparatus as claimed in claim 2 wherein said means for varying the total thermal energy in said spacing member comprises an embedded electric heating element.

6. Apparatus as claimed in claim 2 including a thermal insulation shim interposed between the spacing member and each of said bearing blocks.

7. Apparatus as claimed in claim 3 including a thermal insulation shim interposed between the spacing member and each of said bearing blocks.

8. Apparatus as claimed in claim 5 including a thermal insulation shim interposed between the spacing member and each of said bearing blocks.

* * * * *